United States Patent [19]

Dolan

[11] Patent Number: 4,961,313

[45] Date of Patent: Oct. 9, 1990

[54] THERMALLY INITIATED MECHANICALLY FIRED DEVICE FOR PROVIDING PROTECTION AGAINST SLOW COOK-OFF

[75] Inventor: Cyril F. Dolan, Pacific Palisades, Calif.

[73] Assignee: Hughes Aircraft Company, Los Angeles, Calif.

[21] Appl. No.: 229,662

[22] Filed: Aug. 8, 1988

[51] Int. Cl.⁵ .............................. F02K 9/38
[52] U.S. Cl. ......................... 60/223; 60/253
[58] Field of Search ............... 60/223, 234, 253, 254; 102/481; 220/88 R

[56] References Cited

U.S. PATENT DOCUMENTS

| | | | |
|---|---|---|---|
| 2,487,789 | 11/1949 | Carr . | |
| 2,730,046 | 1/1956 | Bergstrom et al. | 102/481 |
| 3,167,910 | 2/1965 | Weaver | 60/254 |
| 3,702,589 | 11/1972 | Ebert . | |
| 4,047,484 | 9/1977 | Cole . | |
| 4,458,482 | 7/1984 | Vetter et al. | 60/253 |
| 4,478,151 | 10/1984 | Vetter et al. | 102/481 |
| 4,597,261 | 7/1986 | Dolan | 60/223 |
| 4,709,637 | 12/1987 | Boggero | 102/481 |

FOREIGN PATENT DOCUMENTS 163086 12/1985 European Pat. Off. .

Primary Examiner—Louis J. Casaregola
Attorney, Agent, or Firm—R. M. Heald; R. A. Hays; W. Denson-Law

[57] ABSTRACT

Slow cook-off protection for rocket motors is achieved through the use of a slow cook-off trigger mechanism in which a mechanical response is thermally initiated. A metallic housing contains and is thermally coupled to a bimetallic snap action disc spring. A firing pin is connected to the disc spring and telescopically guided by the housing toward an expolosive booster charge. The booster charge is coupled in a conventional manner to a linear shaped charge. The linear shaped charge is disposed adjacent to the rocket motor case in order to cut a stress riser in the casing when activated. The circular bimetallic spring is designed to snap between a first and second configuration to thereby drive the firing pin into the explosive booster charge at a predetermined temperature below the expected ignition temperature of the rocket propellant. After the trigger is activated and the linear chaped charge cuts a stress riser in a rocket casing, continued temperature rise results ignition of the rocket propellant. However, the stress riser in the rocket casing causes the rocketr casing to fail, thereby venting the propellant pressure through the split riser and thereby preventing the development of any substantial propulsive thrust.

18 Claims, 2 Drawing Sheets

THERMALLY INITIATED MECHANICALLY FIRED DEVICE FOR PROVIDING PROTECTION AGAINST SLOW COOK-OFF

BACKGROUND OF THE INVENTION

1. Field of the Invention

This invention is related to a device for preventing propulsive ignition of a rocket motor exposed to a heated ambient or slow cook-off environment. In particular, the invention is related to a mechanism for sensing the heated ambient and triggering a linear shaped charge to create a stress riser on a motor casing or a pressure vessel. Should the motor subsequently ignite, it vents through the stress riser.

2. Description of the Prior Art

One of the primary dangers from storing pressurized vessels and rockets or missiles arises not from the explosive charge or warhead which may be the missile payload, but rather the rocket propellant or rocket motor itself. In particular, fires and other sources of high ambient heat in proximity to rocket motors or pressure vessels create a high risk that the motors will prematurely ignite or that the vessels will violently release pressure. Dolan, Thermally Activated Rocket Motor Safety System, U.S. Pat. No. 4,597,261, taught a thermally activated safety system for protecting against temperature produced by a fortuitous fuel fire, i.e., fast cook off environment. Fast cook off triggers react to instantaneous, or near instantaneous exposure to high temperature, such as flame. For example, one fast cook off trigger in Dolan, 4,597,621, was designed to activate within 30 seconds when exposed to temperatures above 550° F. to 600° F. Generally, these triggers are not designed to be resettable.

Even though the rocket may not be directly exposed to open flame, there is nevertheless a substantial danger that the rocket motor will be ignited when it is exposed to high ambient temperatures over a prolonged period of time, for example, where the temperature of the rocket motor or pressure vessel itself gradually reaches a predetermined ignition temperature, such as temperatures in excess of 350 degrees F. Instances of such ambient exposure could readily occur when stockpiles of rockets or rocket motors are exposed to ambient heat or convection heat caused by the presence of flame in the ambient environment. Specifically, such an event may occur when a magazine, which may not be directly subjected to fire, is gradually heated due to a fire in a nearby compartment on board a ship (i.e., slow cook off).

In such a case, if one of the rocket motors should ignite from prolonged exposure to heat, not only does it become a destructive ballistic even if unarmed, in many cases the rocket ignition may trigger events causing the warhead to be armed.

Therefore, what is needed is some type of device which is rugged and reliable as to be suitable for use with rocket motors or pressure vessels in a slow cook off environment and yet which is capable of sensing a high ambient temperature and thereby taking responsive action to disable a rocket motor from propulsive ignition, or a pressure vessel from premature explosion.

SUMMARY OF THE INVENTION

The invention is a thermally actuated rocket motor safety apparatus comprising a housing, and a first mechanism for sensing the temperature of the housing and for generating a mechanical response when the temperature reaches a predetermined temperature indicating substantial cook-off hazard of the rocket motor. A second mechanism triggers the deactivation of the propulsive thrust capability of the rocket motor in response to the mechanical response generated by the first mechanism for sensing the temperature. As a result, any slow cook-off hazard of the rocket motor when exposed to high ambient temperatures is substantially avoided.

The first mechanism for sensing the temperature and generating a mechanical response is a bimetallic spring disposed within housing and thermally coupled thereto.

The bimetallic spring is circular and circumferentially mechanically and thermally connected to the housing.

The second mechanism is a firing pin connected to the bimetallic spring and an explosive booster charge in operative position within the housing with respect to the firing pin so that movement of the firing pin in response to snap action of the bimetallic spring causes ignition of the explosive booster.

The apparatus further comprises a third mechanism for preventing actuation of the second mechanism until a predetermined temperature, below the temperature needed to activate the first mechanism, is exceeded.

The third mechanism comprises a slideable barrier configurable into a first and second position. The barrier engages the second mechanism when in the first position. The barrier when in the first position prevents operation of the second mechanism. A bimetallic snap action spring is activated at the lower temperature to move the barrier to the second position. When in the second position the barrier is disengaged from the second mechanism and thereby allows operation of the second mechanism.

The spring coupled to the barrier is a bimetallic strap attached at its opposing ends to the housing and thermally coupled thereto.

The apparatus further comprises a third mechanism for cutting the rocket motor case positioned adjacent to the rocket motor case. The mechanism for cutting is coupled to the second mechanism and is initiated by operation of the second mechanism.

The invention can also be characterized as a thermally initiated, mechanically fired device for producing a rocket motor stress riser in response to a predetermined temperature impressed upon the rocket motor by an ambient environment. The device comprises a metallic housing disposed within the rocket body at a location thermally coupled to the ambient environment. A first thermally activated bimetallic snap acting spring is disposed within the housing and is thermally coupled thereto. The first spring is activated at a first predetermined temperature. A firing pin is included and has one end fixed to the first spring. The firing pin telescopically is retained within the housing to thereby permit movement of the firing pin along a predetermined direction. A moveable fail-safe barrier engages the firing pin to prevent movement of the firing pin when the barrier is in a first position. The barrier is moveable to a second position disengaged from the firing pin to permit movement of the firing pin. A second thermally activated bimetallic snap spring is connected to the barrier and thermally coupled to the housing. The second spring is arranged and configured in the housing to position the barrier in engagement with the firing pin when the second spring is in a first configuration and to disengage the barrier from the firing pin when the spring is in the second configuration. The second spring changes between the first and second configuration to thereby move the barrier out of engagement with the firing pin when the second spring has achieved a second predetermined temperature. The predetermined temperature initiating reconfiguration of the second spring between the first and second positions is at a lower temperature than the predetermined temperature for initiating action of the first spring. As a result the firing pin is mechanically actuated when the housing reaches the first predetermined temperature and premature activation of the firing pin at any time before the housing has reached the second predetermined temperature is prevented.

The barrier has a slot having a width slightly greater than the firing pin. The firing pin is slidingly disposed through the slot in the barrier. The firing pin further comprises a radially enlarged collar. The diameter of the radially enlarged collar exceeds the width of the slot in the barrier. The barrier is positioned in front of the collar when in the first position and thereby prevents movement of the firing pin in a predetermined direction.

The device further comprises a mechanism for cutting the rocket motor case positioned adjacent to the rocket motor case. The mechanism for cutting is coupled to the housing and activated by impact with the firing pin. The firing pin is driven against the mechanism in response to action of the first spring in response to being heated to the first predetermined temperature.

The invention can still further be defined as an improvement in a slow cook-off trigger device for igniting a linear shaped charge to cut a stress riser in a rocket motor case. The linear shaped charge is ignited by an explosive booster. The explosive booster in turn is activated by impact with a firing pin. The improvement comprises a first mechanism for guiding motion of the firing pin along a predefined line of direction. A snap action spring is included and is connected to the firing pin. The snap action spring is bimetallic and assumes a first configuration at temperatures below a first preselected temperature and than snaps into a second configuration at temperatures above the first preselected temperature. The movement of the snap action spring between the first and second configurations drives the firing pin through the first mechanism in the predefined direction to contact the explosive booster. As a result a high temperature environment thermally and directly initiates mechanical action resulting in firing of the linear shaped charge.

Consider the preferred embodiments of the invention as depicted in the following drawings where like elements are referenced by like numerals.

The invention and its various embodiments may be better understood by now turning to the following detailed description.

DETAILED DESCRIPTION OF THE PREFERRED EMBODIMENTS

Slow cook-off protection for missile rocket motors and pressure vessels is achieved through the use of a slow cook-off trigger mechanism in which a mechanical response is thermally initiated. A metallic housing contains and is thermally coupled to a bimetallic snap action disc spring. A firing pin is connected to the disc spring and telescopically guided by the housing toward an explosive booster charge. The booster charge is coupled in a conventional manner to a linear shaped charge. The linear shaped charge is disposed adjacent to the rocket motor case in order to cut a stress riser in the casing when activated. The circular bimetallic spring is designed to snap between a first and second configuration to thereby drive the firing pin into the explosive booster charge at a predetermined temperature below the expected ignition temperature of the rocket propellant. A moveable barrier engages the firing pin when the barrier is disposed in a first position to prevent movement of the firing pin toward the explosive booster charge. The moveable barrier is connected to a strap shaped bimetallic snap action spring which is designed to snap between a first and second configuration at a selected temperature lower than that which activates the disc snap action spring. When the strap shaped snap action spring is thermally activated, it moves from the first configuration to its second configuration carrying the barrier with it. When in the second configuration the barrier no longer engages the firing pin and the firing pin is free to move toward the explosive charge under the action of the disc snap action spring. After the trigger is activated and the linear shaped charge cuts a stress riser in a rocket casing, contined temperature rise results in ignition of the rocket propellant. However, the stress riser in the rocket casing causes the rocket casing to fail upon ignition of the motor, thereby venting the propellant pressure through the split riser and thereby preventing the development of any substantial propulsive thrust.

Figure 5:
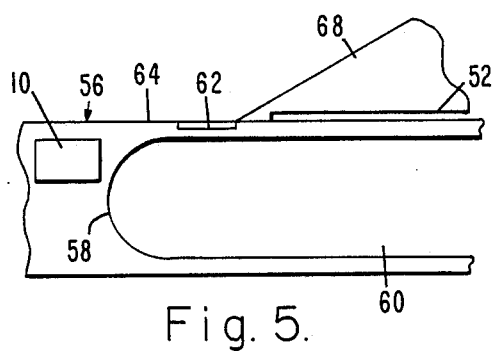
FIG. 5 is a diagrammatic side sectional view of a cutaway portion of a rocket wherein the invention is utilized.

Turning first to FIG. 5, slow cook-off trigger 10 is enclosed within missile body 56 near the head 58 of rocket motor 60. Slow cook off trigger 10 may physically be located in proximity to charge 52 but is thermally positioned or designed such that the temperature sensed by slow cook off trigger 10 corresponds to the average temperature of the trigger body and of the rocket motor or pressure vessel in a slow cook-off environment. A fast cook-off trigger 62, such as described in connection with Dolan, "Thermally Actuated Rocket Motor Safety System", U.S. Pat. No. 4,597,261 (1986), is typically designed to sense the ambient temperature for flame, and is mounted in thermal contact with a missile skin 64. Both fast cook-off trigger 62 and slow cook-off trigger 10 may be commonly coupled to a conventional linear shaped charge 52 included within the base of one of the missile wings 68. The length of charge 52 is placed longitudinally along rocket body 56 in near proximity to rocket motor 60. Ignition of linear shaped charge 52 results in the creation of a groove in rocket motor skin 64. Therefore, when rocket motor 60 ignites, the primary portion of the rocket efflux bursts through the stress riser created by linear shaped charge 52 and very little propulsive force is created. Therefore, instead of becoming airborne, the rocket will harmlessly flame out.

Figure 1:
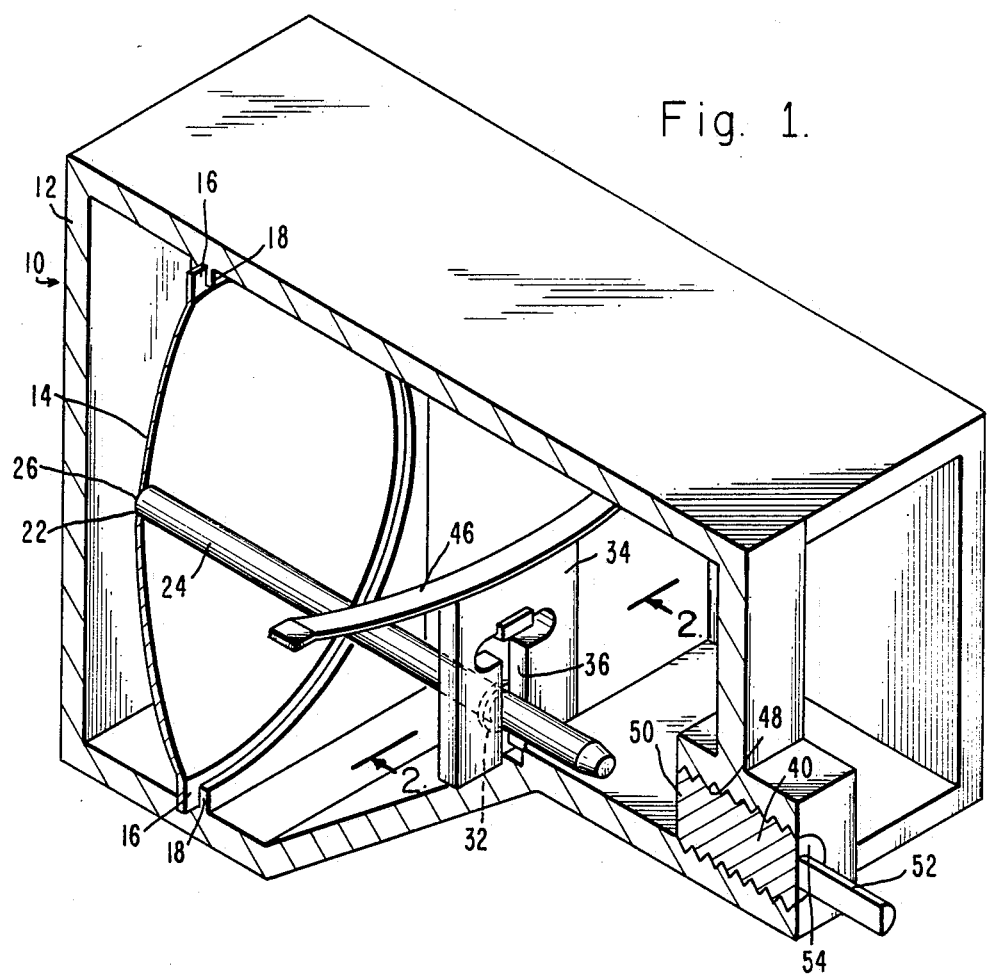
FIG. 1 is a cutaway perspective of the preferred embodiment of the invention.
Figure 4:
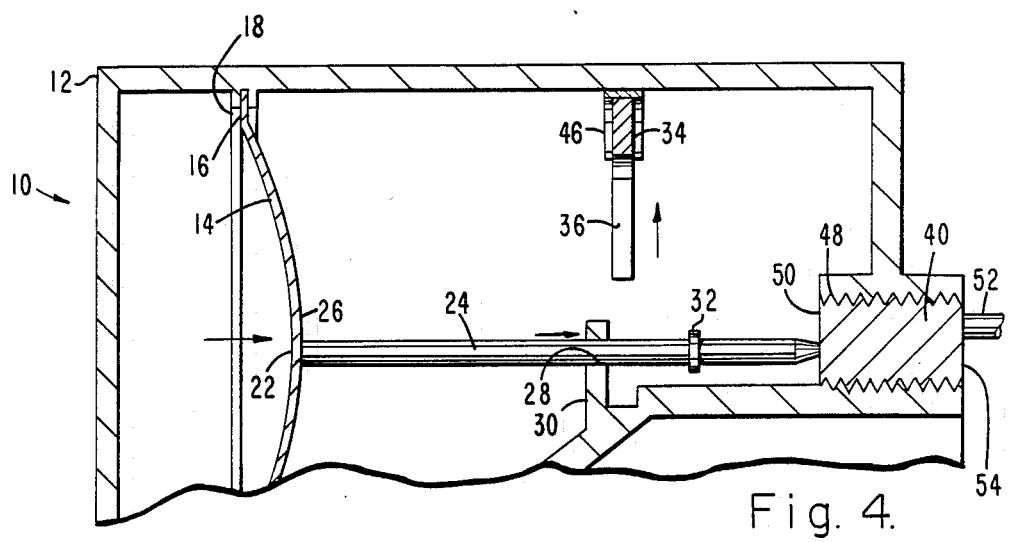
FIG. 4 is a side view of the mechanism shown in FIG. 1 after the firing pin has been activated.and just before the explosive booster has ignited in response to the impact of the firing pin.

FIG. 1 is a cutaway perspective view of a slow cook-off trigger, generally denoted by reference numeral 10. Trigger 10 may be comprised of a rigid housing 12 which provides a closed container for the remaining trigger elements. Contained within housing 12 is a bimetallic snap action disc spring 14. Disc spring 14 is generally circular with its circumferential edges 16 secured within corresponding flanges and grooves, generally denoted by reference numeral 18 defined with the interior surface 20 of housing 12. Bimetallic snap action spring 14 is conventional and is chosen so that it snaps or flexes from the leftward disposed convex shape as depicted in FIG. 1 to a rightward disposed convex shape as best depicted in FIG. 4. Spring 14 snaps between the configurations of FIGS. 1 and 4 at a predetermined temperature which is approximately 15 degrees F. below a predetermined slow look off ignition temperature depending on the rocket motor. In the illustrated embodiment the slow look off ignition temperature can be presumed to be approximately 350 degrees F., but the preferred temperature is determined according to conventional design characteristics pertaining to a rocket motor with which trigger 10 is designed to operate. Therefore, it must be expressly understood that the temperatures described in the specification are relative and can be varied according to the teaching of the invention to any design magnitude.

Circular bimetallic snap action spring 14 is fixed at its center 22 to a metallic firing pin 24. Typically, pin 24 has its leftmost end 26 as seen in FIG. 1 fixed to center 22 of spring 14 by a rivet, threaded bolt, weldment or the like. Firing pin 24 extends to the right within housing 12 and is telescopically guided through-bore guide 28 defined in a flange 30 extending into the interior of housing 12. Therefore, the travel of firing pin 24 is maintained and guided in a predetermined line of direction.

Figure 2:
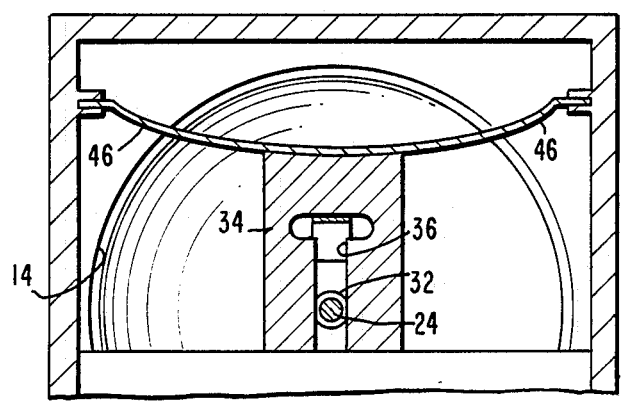
FIG. 2 is a front elevational view of the mechanism of FIG. 1 as seen through lines 2—2 of FIG. 1.

To the right of guide and flange 30 as depicted in FIG. 1 is a collar 32 which is fixed to firing pin 24. Collar 32 may be a pin, eyelet, tube section or any other similar radial enlargement of firing pin 24. Collar 32 is disposed as best shown in FIGS. 1 and 2 behind a movable barrier 34. Movable barrier 34 is preferably made of a filled plastic or similar strong and rigid material and has a vertical slot 36 defined therein through which firing pin 24 extends. However, the width 38 of slot 36, while being greater than the diameter of firing pin 24, is nevertheless smaller than the diamter of collar 32. Therefore, with collar 32 disposed behind or to the left of barrier 34 as depicted in FIG. 1, firing pin 24 is fixed in position and is prohibited from advancing to the right toward explosive booster 40.

Figure 3:
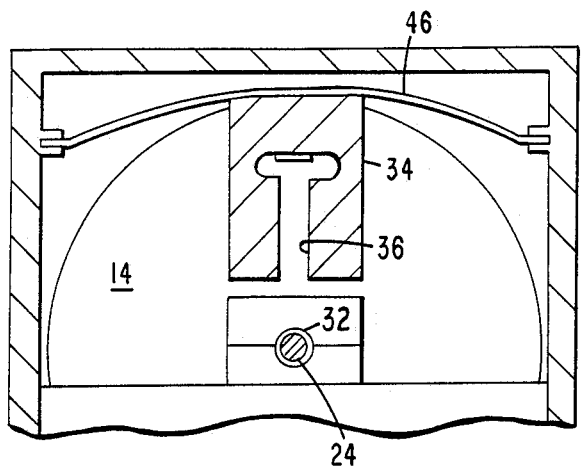
FIG. 3 is the view of FIG. 2 wherein a fail-safe guard has been removed prior to triggering of the mechanism.

In the preferred embodiment, barrier 34 has its outer lateral edges 42 each disposed within mating grooves and flanges 44 defined within interior surface 20 of housing 12. In the preferred embodiment the upper end of barrier 34 is attached to a second bimetallic spring 46. As in the case with the circular bimetallic spring 14, bimetallic spring 46 is activated by temperature to snap between two positions, namely either the downward position as shown in FIG. 1 or the upward position as shown in FIG. 3. The design and constituents of bimetallic spring 46 are chosen according to conventional teachings to snap between the configuration of FIGS. 1 and 2 on the one hand and FIG. 3 on the other hand at a predetermined temperature which is approximately 30 degrees F. below the ignition temperature.

Similarly, in the illustrated embodiment, bimetallic spring 46 is shown as manufactured in the shape of a strap with opposing ends of the strap internally fixed to opposite points within interior surface 20 of housing 12. Barrier 34 is fixed to spring 46 by conventional means, such as by a rivet, threaded bolt, adhesive or the like.

Threaded within a receiving bore 48 of housing 12 is a conventional explosive booster 40. Upon impact by end 50 of firing pin 24, explosive booster 40 is ignited. Thereafter the linear shaped charge 52, which contacts the opposing end 54 of explosive booster 40, is similarly ignited. The ignition of linear shaped charge 52 will utimately result in the creation of a stress riser within the rocket motor or motor casing as diagrammatically described in connection with FIGS. 5 and 6 below.

First, however, the various elements of the slow cook-off trigger 10 now having been separately described, consider the operation of trigger 10. Trigger 10, as shown in FIG. 5 is disposed within the body of the missile in a location to sense representative temperatures to which the rocket motor would be subjected in a heated ambient. Generally, a position near the head of the rocket motor spaced away from the missile skin is preferred.

Initially, as seen in FIGS. 1 and 2, firing pin 24 is in the leftmost position as shown in FIG. 1 and barrier 34 is down in front of collar 32 as depicted in FIG. 2. Barrier 34 prevents the inadvertent flexure of spring 14 which conceivably may be caused by mechanical virbrations or shock in rough handling. Thus, trigger 10 can be handled without danger of premature activation.

In the event that trigger 10 of the missile may be subjected to elevated ambient temperatures, the entire missile body and in particular trigger 10, including housing 12 and the bimetallic spring elements 14, 46 therein, similarly rise in temperature. In the illustrated embodiment, at approximately 320 degrees F., spring 46 snaps from the position shown in FIG. 2 to that shown in FIG. 3. Firing pin 24 and collar 32 are now cleared and firing pin 24 may be advanced toward explosive booster 40.

Should the temperature rise an additional 15 degrees, to approximately 335 degrees F., bimetallic spring 14 will snap from the configuration shown in FIG. 1 to that shown in FIG. 4, thereby driving firing pin 24 into explosive booster 40. However, should the temperature fail to reach 335 degrees F., but thereafter should decrease, the action of bimetallic spring 46 is reversible so that below 320 degrees F., bimetallic spring 46 will snap back and resume the configuration of FIG. 2.

Figure 6:
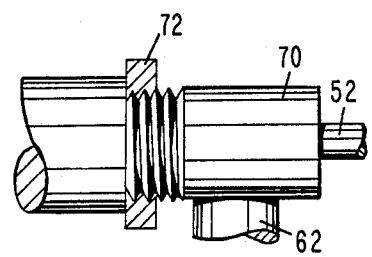
FIG. 6 is a diagrammatic view illustrating the combination of a fast cook-of and slow cook-off trigger with a single explosive booster and linear shaped charge.

FIG. 6 is a diagrammatic depiction of how slow cook-off trigger 10 and fast cook-off trigger 62 may each be coupled to an explosive booster 70 which may be used, for example, in place of explosive booster 40 as depicted in FIGS. 1-4. Explosive booster 70 is coupled by means of a B-nut 72 to slow cook-off trigger 10 in the manner substantially similar to explosive booster 40 in FIGS. 1-4. The linear shaped charge 52 is, as before, coupled to explosive booster 70 and is ignited thereby. However, in addition to slow cook-off trigger 0, fast cook-off trigger 62 also contacts explosive booster 70 so that either trigger 10 or 62 may serve to ignite linear shaped charge 52 as depicted in FIG. 5 and thereby achieve the same result. Fast cook-off trigger 62 differs from slow cook-off trigger 10 in that fast cook-off trigger 62 will react to instantaneous or near-instantaneous exposure to high temperatures, such as flame, without requiring a general increase in the average temperature of missile body 56 as would be characteristic of slow cook-off trigger 10.

Many modifications and alterations may be made by those having ordinary skill in the art without departing from the spirit and scope of the invention. Therefore, it must be understood that the illustrated embodiment has been set forth only by way of example and for the purposes of clarity, and not as a limitation or restriction upon the invention as defined by the following claims.

What is claimed is:

1. A rocket having a thermally actuated rocket motor safety apparatus comprising:
    a main rocket body;
    a rocket motor coupled to said rocket body and thermally coupled to an ambient environment; and
    said safety apparatus, said safety apparatus comprising:
    first means for sensing the temperature of said ambient environment and generating a mechanical response when said temperature reaches a first predetermined temperature indicating substantial slow cook-off hazard of said rocket motor;
    a housing mechanically coupled to the main rocket body and thermally coupled to the ambient environment, said first means including a bimetallic spring disposed in said housing and thermally coupled to said housing;
    said means for triggering the deactivation of the propulsive thrust capability of said rocket motor in response to said mechanical response generated by said first means for sensing said first temperature;
    whereby slow cook-off hazard of said rocket motor is substantially avoided.

2. The rocket of claim 1 wherein said bimetallic spring is circular and circumferentially and mechanically, connected to said housing.

3. The rocket of claim 1 wherein said second means is a firing pin connected to said bimetallic spring and an explosive booster charge in operative position within said housing with respect to said firing pin so that movement of said firing pin in response to snap action of said bimetallic spring causes ignition of said explosive booster.

4. The rocket of claim 1 further comprising third means for preventing actuation of said second means until a predetermined second temperature is exceeded, said second temperature being below the first temperature needed to activate said first means.

5. The rocket of claim 4 wherein said third means comprises:
    a slideable barrier configurable into a first and second position, said barrier engaging said second means when in said first position, said barrier when in said first position preventing operation of said second means; and
    a bimetallic snap action spring activated at said second temperature to move said barrier to said second position, wherein in said second position said barrier being disengaged from said second means and thereby allowing operation of said second means.

6. The rocket of claim 5 wherein said spring coupled to said barrier is a bimetallic strap attached at its opposing ends to said housing and thermally coupled thereto.

7. The rocket of claim 5 further comprising means for cutting said rocket motor case positioned adjacent to said rocket motor case, said means for cutting being coupled to said second means and initiated by operation of said second means.

8. The rocket of claim 1 further comprising third means for cutting said rocket motor case positioned adjacent to said rocket motor case, said means for cutting being coupled to said second means and initiated by operation of said second means.

9. A thermally initiated, mechanically fired device for producing a rocket motor stress riser in response to a predetermined temperature impressed upon said rocket motor by an ambient environment, said device comprising:
    a metallic housing disposed within said rocket body at a location thermally coupled to said ambient environment;
    a first thermally activated bimetallic snap acting spring disposed within said housing and thermally coupled thereto, said first spring being activated at a first predetermined temperature;
    a firing pin having one end fixed to said first spring, said firing pin telescopically retained within said housing to thereby permit movement of said firing pin along a predetermined direction;
    a movable fail-safe barrier engaging said firing pin to prevent movement of said firing pin when said barrier is in a first position, said barrier moveable to a second position disengaged from said firing pin to permit movement of said firing pin; and
    a second thermally activated bimetallic snap spring connected to said barrier and thermally coupled to said housing, said second spring arranged and configured in said housing to position said barrier in engagement with said firing pin when said second spring is in a first configuration and to disengage said barrier from said firing pin when said spring is in said second configuration, said second spring changing between said first and second configuration to thereby move said barrier out of engagment with said firing pin when said second spring has achieved a second predetermined temperature, said predetermined temperature initiating reconfiguration of said second spring between said first and second positions at a lower temperature than said predetermined temperature for initiating action of said first spring,
    whereby said firing pin is mechanically actuated when said housing reaches said first predetermined temperature and whereby premature activation of said firing pin at any time before said housing has reached said second predetermined temperature is prevented.

10. The device of claim 9 wherein said barrier defines a slot having a width slightly greater than said firing pin, said firing pin being slidingly disposed through said slot in said barrier, said firing pin further comprising a radially enlarged collar, the diameter of said radially enlarged collar exceeding said width of said slot in said barrier, said barrier being positioned in front of said collar when in said first position thereby preventing movement of said firing pin in a predetermined direction.

11. The device of claim 9 wherein said first snap action spring is a circular disc which is circumferentially connected and thermally coupled through said circumferential connection to said housing.

12. The device of claim 9 further comprising means for cutting said rocket motor case positioned adjacent to said rocket motor case, said means for cutting being coupled to said housing and activated by impact with said firing pin, said firing pin being driven against said means in response to action of said first spring in response to being heated to said first predetermined temperature.

13. An improvement in a trigger device for igniting a linear shaped charge to cut a stress riser in a rocket motor case, said linear shaped charge being ignited by an explosive booster, said explosive booster in turn being activated by impact with a firing pin, said improvement comprising:

first means for guiding motion of said firing pin along a predefined line of direction;

a snap action spring connected to said firing pin, said snap action spring being bimetallic and assuming a first configuration at temperatures below a first preselected temperature and then snapping into a second configuration at temperatures above said first preselected temperature, movement of said snap action spring between said first and second configurations driving said firing pin through said first means in said predefined direction to contact said explosive booster;

whereby a high temperature environment initiates mechanical action resulting in firing of said linear shaped charge.

14. The improvement of claim 13 wherein said snap action spring is a circular spring.

15. The improvement of claim 13 further comprising fail-safe barrier means engaging said firing pin for preventing movement of said firing pin at temperatures below a second selected temperature and permitting movement of said firing pin at temperatures above said second selected temperature.

16. The improvement of claim 15 wherein said fail-safe barrier means comprises a moveable barrier arm which engages said firing pin and a second snap action spring coupled to said barrier arm, said second snap action spring assuming a first configuration at temperatures below said second preselected temperature to position said barrier arm into engagement with said firing pin, said second snap action spring assuming a second configuration at temperatures above said second selected temperature to disengage said barrier arm from said firing pin.

17. The improvement of claim 16 further comprising a metallic housing forming a temperature sink, said first means, snap action spring and said fail-safe barrier means disposed within said housing and thermally coupled thereto so that temperatures experienced by said first means, snap action spring and fail-safe barrier means are substantially equal to the temperature of said housing.

whereby coordinated action between said first means, snap action spring and fail-safe barrier means is permitted.

18. A system having a thermally actuated pressure vessel safety apparatus comprising:

a pressure vessel included in said system and thermally coupled to an ambient environment; and a safety apparatus included in said system and thermally coupled to said ambient environment said safety apparatus comprising:

bimetallic spring for sensing the temperature of said apparatus and generating a mechanical response when said temperature indicates substantial slow cookoff hazard to said pressure vessel; and second means for triggering the deactivation of the pressure hazard capability of said pressure vessel in response to said mechanical response generated by said bimetallic spring, whereby slow-cook off hazard of said rocket motor is substantially avoided.

* * * * *